J. G. MURPHY.
FASTENING FOR HORSE BLANKETS.
APPLICATION FILED JUNE 11, 1912.
1,051,618.
Patented Jan. 28, 1913.
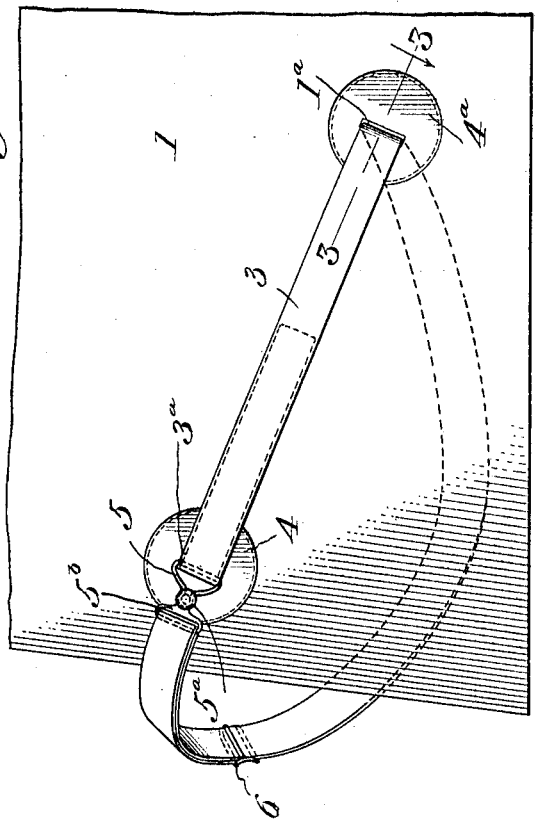
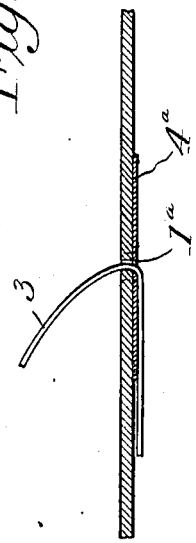
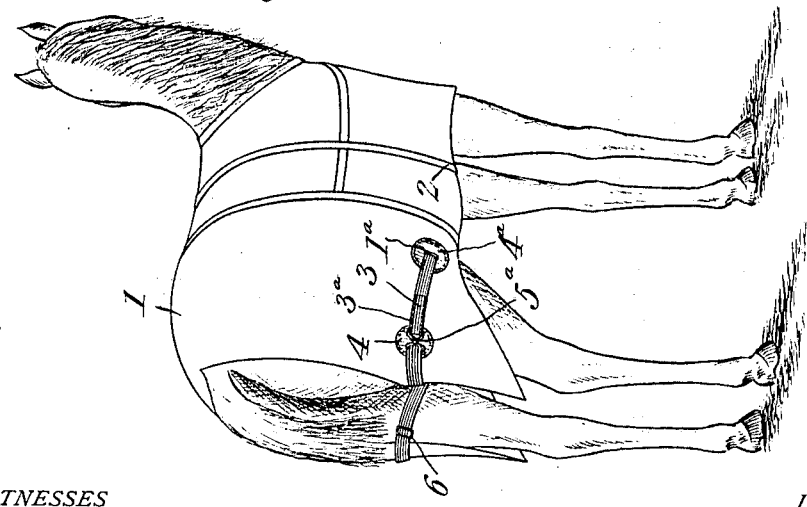
WITNESSES
INVENTOR
John G. Murphy
Attorneys

UNITED STATES PATENT OFFICE.

JOHN G. MURPHY, OF CHICO, CALIFORNIA.

FASTENING FOR HORSE-BLANKETS.

1,051,618.  Specification of Letters Patent.  Patented Jan. 28, 1913.

Application filed June 11, 1912. Serial No. 703,010.

*To all whom it may concern:*

Be it known that I, JOHN G. MURPHY, of Chico, in the county of Butte and State of California, have invented certain new and useful Improvements in Fastenings for Horse-Blankets; and I hereby declare that the following is a full, clear, and exact description thereof, reference being had to the accompanying drawings, which form part of this specification.

This invention is an improvement in horse blankets and its object is to provide a blanket which will be comfortable to the animal; can be very readily put on or taken off; and will not be displaced by the movements of the animal in lying down or moving about.

The invention relates particularly to the means for fastening the rear portions of the blanket to the thighs or rear legs of the animal; and I will explain it fully with reference to the accompanying drawings, in which—

Figure 1 represents a blanket secured to a horse by my invention. Fig. 2 is an enlarged view of part of the blanket showing one of the fastening straps; and Fig. 3 is an enlarged section on line 3—3, Fig. 2.

The blanket 1 may be of any desired kind and of the ordinary shape, adapted to fit over the animal, and may be secured at its front end around the neck of the animal by any usual means, not shown. The blanket is shown as provided with a belly-band or surcingle 2 which may be fastened in any suitable way, not shown.

To the rear corners of the blanket, which are adapted to hang over the back quarters of the animal, I attach novel fastening devices by which the rear portions of the blanket may be fastened to the thighs of the animal. These fastening devices are of novel construction, and each comprises a strap 3, one end of which is preferably fastened permanently to the blanket as at $3^a$ by stitching or in other suitable way. Preferably I reinforce the blanket at the point where the strap is attached thereto by a disk or pad 4 which may be of cloth, leather or other suitable material; and which may be sewn or otherwise secured to the blanket, and is preferably of such size as to cover the connection between the two ends of the strap. The reinforcing disks 4 are located at such points on the blanket that they will lie near the rear of the animal's legs when the blanket is in position thereon. The free end of each strap is carried forward to the front of the animal and there passes through a slot or eye $1^a$ in the blanket which is preferably reinforced at such slot by a disk $4^a$ of cloth or other suitable material, which may be stitched to the blanket as shown.

The reinforcing disks might be omitted, but are preferably employed to give additional strength and wearing qualities to the blanket at the points where any strain or chafing of the straps would come thereupon. Each strap is long enough to extend from the slot $1^a$ back around the leg of the animal, as indicated in the drawings, to the disk 4 where it may be attached to the forward end of the strap. Any suitable fastening device may be used, but I prefer to employ a quickly detachable fastening consisting of a metal loop 5 attached to the fast end of the strap 3, or the disk 4, and adapted to be engaged by a button $5^a$ attached to the free end of the strap as by a loop $5^b$ strung in a loop of the free end of the strap, which end is connected to a slide 6 on the body of the strap, and said slide can be adjusted so as to lengthen or shorten the distance or length between the loop 5 at one end of the strap and the button $5^a$ at the other end thereof. The straps 3 can be easily adjusted so as to hold the blanket closely and neatly to the legs of the horse as shown.

The straps as described form a perfectly flexible and secure means of holding the blanket to the horse, and do not put any strain upon the blanket itself, such as would occur if the two ends of the strap were fastened to the blanket at different points; any strain comes only upon the straps and when the animal is standing up, lying down, or moving about, the straps will readily adjust themselves to the animal without tearing or straining the blanket, and will not bind on the animal. As the straps pass loosely through the blanket at the slots $1^a$ the straps can adjust themselves and slip back and forth as may be required by the motions of the animal without straining or tearing the blanket.

What I claim is:

A horse blanket having at each rear corner a fastening means comprising a strap fastened at one end to the outside of the blanket, said strap passing through an opening in the blanket adjacent the fastened end and arranged to pass around the adjacent leg of the horse, and means for detachably attaching the free end of such strap to the end fastened to the blanket.

In testimony that I claim the foregoing as my own, I affix my signature in presence of two witnesses.

JOHN G. MURPHY.

Witnesses:
 WM. J. O'CONNOR,
 C. L. CROWDER.

Copies of this patent may be obtained for five cents each, by addressing the "Commissioner of Patents, Washington, D. C."